May 12, 1964 E. B. BYAM 3,132,358
ROD FEED AND CUT-OFF CONTROL
Filed Oct. 3, 1961 3 Sheets-Sheet 1

INVENTOR
Erwin B. Byam
BY
Spencer, Rockwell & Bartholow
ATTORNEYS

May 12, 1964  E. B. BYAM  3,132,358
ROD FEED AND CUT-OFF CONTROL
Filed Oct. 3, 1961  3 Sheets-Sheet 2

INVENTOR
Erwin B. Byam
BY
Spencer, Rockwell & Bartholow
ATTORNEYS

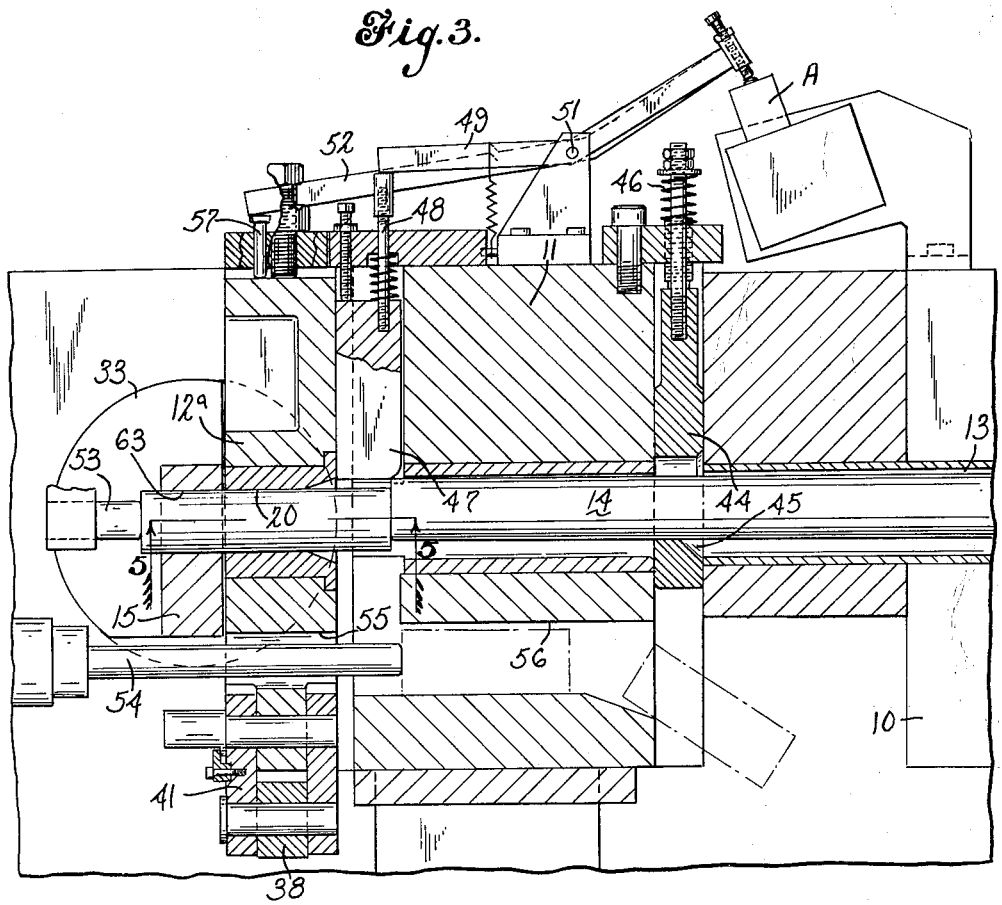
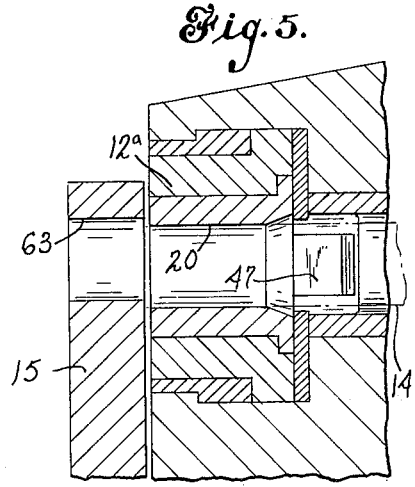
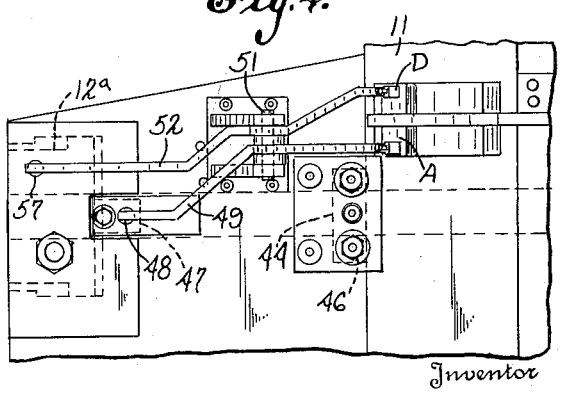

United States Patent Office 3,132,358
Patented May 12, 1964

3,132,358
ROD FEED AND CUT-OFF CONTROL
Erwin B. Byam, Wolcott, Conn., assignor to
Textron Inc., Providence, R.I.
Filed Oct. 3, 1961, Ser. No. 142,644
8 Claims. (Cl. 10—25)

This invention relates generally to a cut-off control for ejecting the end portion of a rod which remains after a plurality of blanks have been severed from the rod stock. More particularly, the invention relates to a cut-off control for metal processing machines such as headers or nut and bolt formers wherein wire or rod stock to be processed is fed into the machine and cut into workpieces of a desired length for processing and the remaining portion of the stock is not of sufficient length to be held and severed to provide a workpiece blank of the proper size and tolerance. Most specifically, the invention relates to an ejecting mechanism for automatically ejecting the end piece from the machine when the end piece remaining from the bar stock is either too short to provide an additional workpiece blank or is too short to be held in the cut-off station of the machine and cleanly severed to provide an additional workpiece blank.

In machines where workpiece blanks are severed from a length of rod stock, the end of the rod usually may not be utilized and is discarded. This is because the rods fed to the cut-off station are or may be of unequal lengths and the last portion of the rod is not long enough to form a blank. Or, if the last portion is long enough to form a blank with an additional amount still remaining, then the remaining amount may not be of sufficient length to be securely held while the blank is being cut therefrom and this additional portion will tend to gather. In some cases where the new bar stock followed immediately behind the expended bar, the last portion of the old bar could gather and jam against the cut-off knife.

Accordingly, it is an object of this invention to provide at the cut-off station of a metal processing machine means to prevent jamming of the machine as rod stock is continually fed to the cut-off station and workpieces severed therefrom.

Another object of the invention is to provide means for disposing of the remaining section of rod after the maximum number of workpieces have been severed therefrom.

A further object of the invention is to provide means for ejecting the waste portion of rod stock as new stock is fed to the cut-off station and to thereby prevent the waste portion from jamming the machine.

Still other objects and advantages of the invention will in part be obvious and will in part be apparent from the specification.

Generally speaking, in accordance with this invention, metal processing machines such as headers or nut and bolt formers have a first cut-off station to which is fed long lengths of wire or rod stock for the severing of workpieces therefrom. When the maximum number of workpieces have been severed from a length of stock and a small piece of stock remains on the machine, the new length of stock directly following the expended stock causes the ejecting cycle to start. During the cycle the cut-off die moves the remaining piece out of alignment with the new stock to a position where it may be acted upon by an ejecting rod. After the piece has been ejected, the cut-off die returns to its normal position and the new length of stock is operated upon and workpieces are severed therefrom.

The invention accordingly comprises the features of construction, combinations of elements, and arrangement of parts which will be exemplified in the construction hereinafter set forth, and the scope of the invention will be indicated in the claims.

For a fuller understanding of the invention, reference is had to the following description taken in connection with the accompanying drawings in which:

FIG. 3 is a sectional view taken along line 3—3 of FIG. 2 showing the cut-off and ejecting station;

FIG. 4 is an enlarged partial view of the switch-operating levers of FIG. 1;

FIG. 5 is a sectional view taken along line 5—5 of FIG. 3 showing the relationship of the knife to the cut-off die at a particular stage of the ejecting operation.

Figure 1:
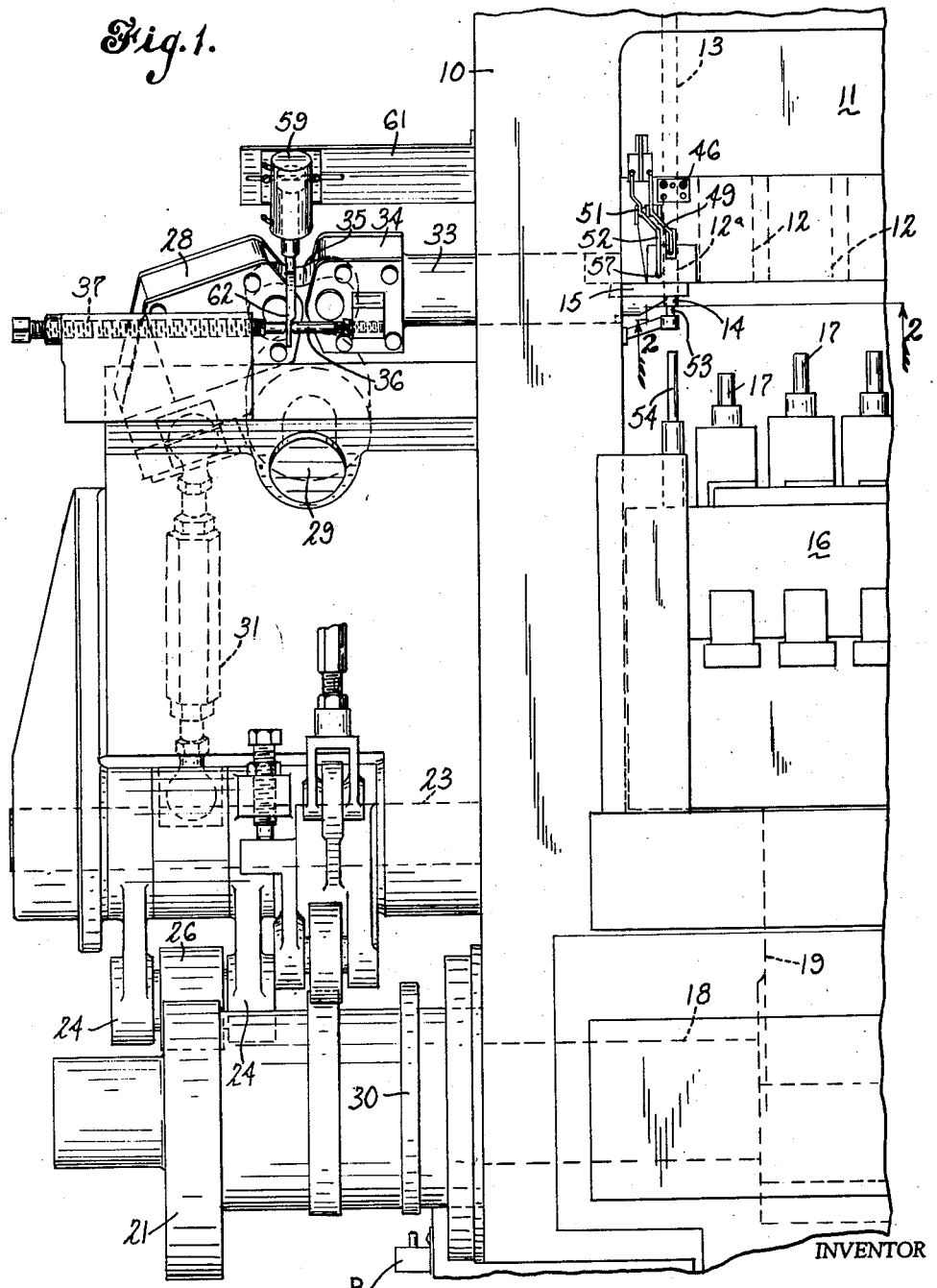
FIG. 1 is a top plan view of a portion of a nut former having the ejecting mechanism positioned to operate at the cut-off station.

Referring now to the drawings, the invention is applied at the cut-off station of a nut former or similar machine more fully described in U.S. Patent No. 2,730,731, issued January 17, 1956, to J. M. Schaeffer. Referring particularly to FIG. 1, the machine comprises a main frame 10 which carries a die bed 11 having a series of dies 12 mounted thereon, cut-off die 12a being positioned at the first station. Main frame 10 is provided with an opening 13 through which is fed rod stock 14 from which workpieces will be severed by knife 15 operated in a manner described in aforementioned patent. A gate 16 is reciprocably mounted on the frame and carries tools 17 which cooperate with dies 12 to act on the workpiece at successive stations. A crankshaft 18 is rotatably mounted in main frame 10 and driven by suitable means (not shown). Gate 16 is journaled to crankshaft 18 through pitman 19 thereby providing the reciprocating rectilinear motion of the gate. Crankshaft 18 is provided with a cam 21. A shaft 23 is mounted in main frame 10 and rockably mounted thereon is a pair of arms 24 which carries a cam follower 26 which contacts cam 21. A rocker block 28 is rockably mounted on an inclined stub shaft 29 mounted in main frame 10. A turnbuckle assembly 34 cooperatively connects rocker block 28 to the pair of arms 24 to impart a rocking motion to the rocker block in a clockwise and counterclockwise direction about stub shaft 29 by cooperation of cam follower 26 with cam 21 as crankshaft 18 is rotated. The operation of the rocking mechanism is more fully described in aforementioned Patent No. 2,730,731.

A cutter bar 33 is slidably mounted in the frame and has a knife 15 attached to one end thereof. Attached at the other end of the cutter bar is a head 34 having one end of a link 35 pivoted thereto. The other end of link 35 is pivoted to rocker block 28 thereby providing rectilinear motion of cutter bar 33 in response to the rocking of rocker block 28. An adjustable stop 36 is mounted on head 34 and is adapted to engage a stop screw 37 secured in the main frame to determine the stop position of knife 15 on the return stroke of gate 16. A switch B is mounted on main frame 10 and is positioned adjacent a cam 30 mounted on crankshaft 18 to be operated in timed relation to the rotation of the crankshaft.

Figure 2:
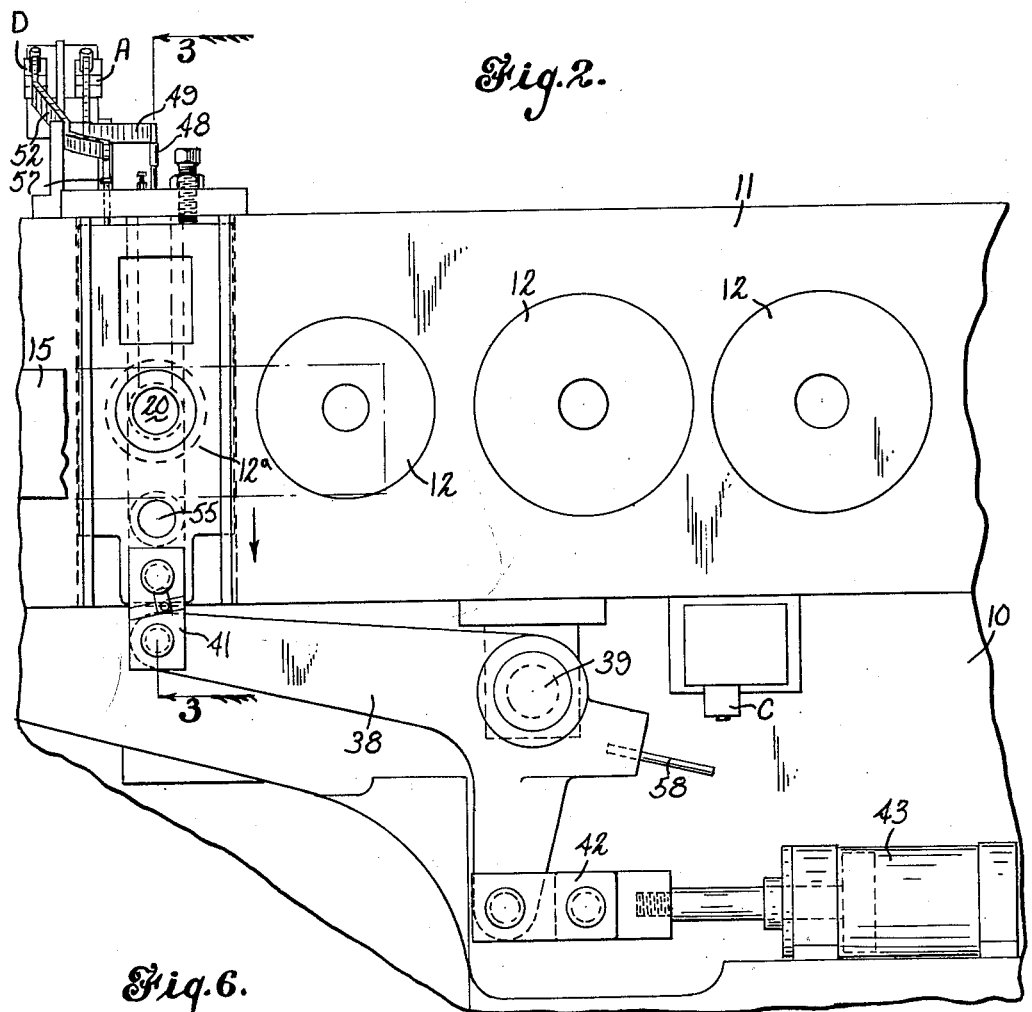
FIG. 2 is a sectional view taken along line 2—2 of FIG. 1 showing the mechanism for moving the cut-off dies.

Referring now to FIG. 2, cut-off die 12a is slidably mounted on die bed 11 and is suitably guided so that it may slide in a vertical direction as shown by the arrow. A bell crank 38 is pivotally connected at 39 to main frame 10. One end of bell crank 38 is pivotally connected to cut-off die 12a through link 41. The other end of the bell crank is connected through a link 42 to an air cylinder 43 which is mounted on the main frame. It will easily be seen that when the air cylinder is operated to cause bell crank 38 to rotate in a counterclockwise direction, cut-off die 12a will thereby be moved vertically downward.

Referring now to FIG. 3, there is shown an end portion only of rod stock 14 remaining in cut-off die 12a with a new length of rod stock being fed to the cut-off station through opening 13. A guide 44 having a hole 45 therein through which passes the new rod stock 14 is slidably mounted in die bed 11, guide 44 being urged upwardly by a spring 46 which bears against a bracket attached to the die bed. A signal blade 47 is slidably mounted on die bed 11 between the die bed and cut-off die 12a. The signal blade is provided with a shaft 48 extending beyond the frame and contacting one end of a lever 49 which is pivoted at 51 between the ends thereof to a bracket on the die bed. The other end of lever 49 is adapted to contact a switch A mounted to the main frame when lever 49 is rotated in a clockwise direction by the raising of signal blade 47. A second lever 52 (FIG. 4) is also pivoted at 51 between the ends thereof, with one end of the lever contacting a pin 57 which engages cut-off die 12a. The other end of lever 52 engages and depresses a switch D mounted to the main frame and maintains switch D in the depressed position when the die opening 20 in cut-off die 12a is aligned with opening 13 in the die bed.

Refering again to FIG. 3, there is provided an adjustable stop 53 adapted to contact the end of rod stock 14 thereby determining the length of workpiece to be severed. An ejecting bar 54 is mounted to gate 16 and reciprocates therewith. As shown in FIG. 3, the ejecting bar advances to a position within the die bed and cut-off die 12a is therefore provided with a clearance hole 55 through which the ejecting bar passes on the advancing stroke of the gate during the normal severing operation. The die bed is provided with an ejecting channel 56 from which the end portions of the rod stock will be ejected.

Figure 6:
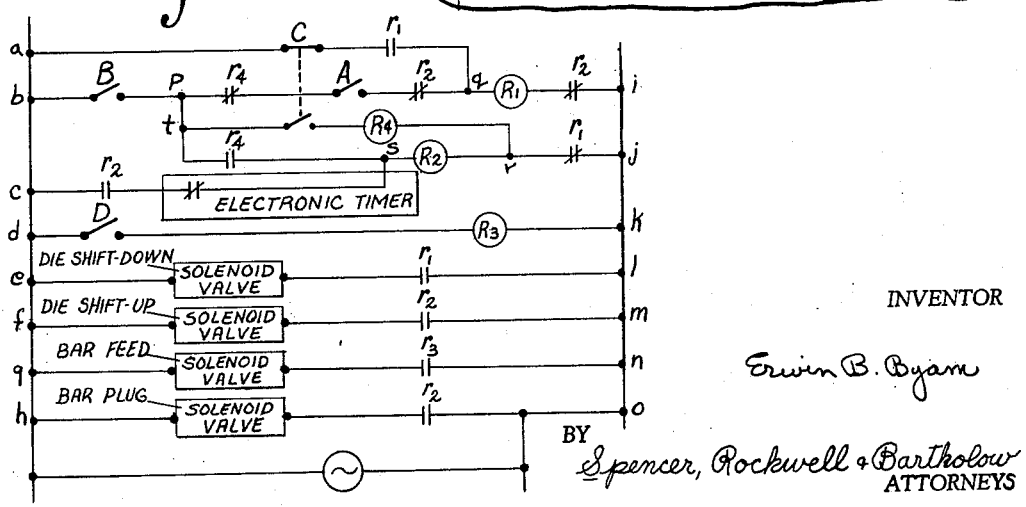
FIG. 6 is a diagram of the circuit which controls and operates the ejecting mechanism.

As a length of rod stock 14 is fed to the cut-off station, a predetermined length of workpiece is severed therefrom by knife 15 with each cycle of gate 16 and the workpiece will be transferred to the next station in the manner described in aforementioned Patent No. 2,730,731. When the length of rod stock is reduced so that further severing of workpieces therefrom may cause jamming of the machine or unclean severing, the new rod stock 14 which is being fed to the cut-off station immediately behind the expended rod starts the ejecting cycle in the following manner. Guide 44 raises the rod stock under the force of spring 46 (FIG. 3). The end of the rod stock strikes signal blade 47 urging it upwardly and causing shaft 48 to rotate lever 49 in the clockwise direction thereby closing switch A. As is seen in FIG. 1, on the next advance stroke of gate 16, cam 30 will contact switch B and close that switch. Referring now to FIG. 6, the closing of switches A and B completes the circuit in path $b—p—q—i$ thereby activating relay $R_1$. The activation of relay $R_1$ closes the normally open contacts $r_1$ in path $a—q—i$ thereby maintaining the activation of the relay $R_1$ when switch B is opened by the return movement of the gate. Activation of relay $R_1$ also closes the contacts $r_1$ in line $e—l$ thus operating the solenoid valve in that line causing air cylinder 43 (FIG. 2) to rotate bell crank 38 in the counterclockwise direction causing cut-off die 12a to move downwardly and carry with it the length of rod stock to be ejected. As die 12a moves downwardly, pin 57 moves therewith allowing lever 52 to rotate in the counterclockwise direction and move out of contact with switch D thereby allowing the normally closed switch to close. It will be seen in the circuit diagram that this completes the circuit through line $d—k$ and activates relay $R_3$ which further completes the circuit through line $g—n$ by closing contacts $r_3$ which activates the solenoid valve in that line and causes the feed rollers (not shown) which advance rod stock 14 to move out of contact with the rod stock and cease feeding.

When cut-off die 12a has been moved down so that the center line of die opening 20 is opposite ejecting channel 56 a rod 58 mounted in bell crank 38 contacts a switch C mounted on the frame. The contacting of switch C opens the path $a—q—i$ but completes the path $p—t—r$. On the next advancing stroke of the gate, ejecting bar 54 enters die opening 20 and ejects the end section of rod stock 14 from the machine through ejecting channel 56. On an advancing stroke of the gate switch B is again closed completing the path $b—p—q—i$ since switch A remains closed as long as the end of the new rod stock 14 contacts signal blade 47. The closing of switch B also completes the path $b—p—t—r—j$ which activates relay $R_4$ thereby opening the normally closed contacts $r'$ in the line $p—q$ to take switch A out of the circuit. The activation of relay $R_4$ also completes the path $b—p—t—s—r—j$ by closing normally open contacts $r'$ in that line and since removal of switch A from the circuit has returned the contacts $r'$ in line $r—j$ to the normally closed position. Completion of the circuit $b—p—t—s—r—j$ activates relay $R_2$ thereby completing the circuit through line $c—s—r—j$ by closing normally open contacts $r_2$ which starts the electronic timer. The electronic timer maintains the activation of relay $R_2$ and $R_4$ when the gate starts its return travel and opens switch B.

Referring again to FIG. 1, an air cylinder 59 is mounted to a bracket 61 attached to main frame 10. Air cylinder 59 controls the movement of a bar plug 62 which is adapted to be inserted between adjustable stop 36 and stop screw 37 to prevent cutter bar 33 and knife 15 to return to the fully-out position when the gate completes its cycle. Air cylinder 59 is operated by the solenoid valve in line $h—o$ of the circuit diagram which operates concurrently with the activation of relay $R_2$ by the closing of contacts $r_2$. Since relay $R_2$ is held in the activated condition until the electronic timer runs out, bar plug 62 will not be removed from between adjustable stop 36 and stop screw 37 until the timer runs out. When relay $R_2$ is activated the circuit through line $f—m$ is also closed through contacts $r_2$ thereby operating the solenoid valve in that line which operates air cylinder 43 (FIG. 2) in a direction causing bell crank 38 to be rotated in a clockwise direction thus returning cut-off die 12a to its normal position of alignment to receive the rod stock. Switch C is released, de-activating relay $R_4$. Relay $R_2$ remains activated by a circuit through the electronic timer thus keeping switch A out of the circuit by holding open the normally closed contacts $r_2$ in line $p—q$. It is necessary that switch A be kept out of the circuit until it is allowed to open so that the eject cycle will not be started again. When cut-off die 12a reaches its normal position, pin 57 contacts lever 52 thereby causing switch D to be depressed to open the circuit line $d—k$ and de-activate relay $R_3$ to allow the feed rollers to again contact rod stock 14. However, since the electronic timer is still running and maintaining the activation of relay $R_2$ to hold the bar plug 62 in the extended position, the center line of the opening 63 in knife 15 will be held out of alignment with die opening 20 as shown in FIG. 5. Thus, the feed rollers will only be able to feed rod stock 14 into die opening 20 until the rod stock abuts knife 15 due to the non-alignment of the openings. When rod stock 14 is fed into the die opening the rod stock will be forced down as shown in FIG. 3 thereby taking it out of contact with signal blade 47 and opening switch A. The length of operation of the electronic timer is set so that it runs out after switch A has opened. The running out of the timer de-activates relay $R_2$ thereby breaking the circuit in line $h—o$ and bar plug 62 is drawn into air cylinder 59 allowing knife 15 to return to its normal position thereby allowing rod stock 14 to be fed through the knife to contact adjustable stop 53 to set the length of workpiece to be severed from the new rod stock. It should be noted that after the feed rollers are moved back into contact with the bar stock by the opening of relay $R_3$, the rod stock is fed through the die opening until it contacts knife 15 whereupon the feed rollers which are in contact with the rod stock continue to operate but slip with relation to the rod stock due to the resistance encountered by the rod stock.

The circuit has now been returned to its normal state as shown in FIG. 6 and signal blade 47 will not be again contacted to start the ejecting cycle until the remaining segment of the bar from which workpieces are being severed is so short that it permits the following length of rod stock to be moved upward by guide 44 and contact signal blade 47.

It will thus be seen that the objects set forth above, among those made apparent from the preceding description are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a machine for processing metal blanks having a slideably mounted cut-off die, a reciprocating gate and a cut-off knife mounted to be reciprocated in synchronization with the gate over a path substantially parallel to the face of the cut-off die to sever blanks from a length of stock, the combination with the machine of ejecting means for ejecting the end portion of the stock from the cut-off die as a new length of stock is being fed to the die, said ejecting means comprising first means adapted to cooperate with the new length of stock for starting the ejecting cycle, positioning means operated in response to said first means to laterally displace said cut-off die and the end portion of stock carried thereby from the normal cut-off position to a position at which ejection of the end portion of stock will occur, an ejecting bar controlled by the gate and adapted to eject the end portion of the stock from the cut-off die upon reciprocation of the gate, and second means for operating said positioning means to return the cut-off die to the normal cut-off position.

2. The structure defined in claim 1 wherein said first means comprises a first switch operated in response to the position of the new length of stock and a second switch controlled in timed relationship with the gate to cause said positioning means to operate when said first and second switches are closed concurrently.

3. The structure defined in claim 1 wherein said first means comprises a guide slidably mounted in the machine and positioned to urge the new length of stock in one lineal direction, signal means mounted in the machine and adapted to be engaged by the new length of stock when the stock is urged in the lineal direction by said guide, a first switch mounted on the machine and controlled by said signal means, said first switch adapted to be closed when said signal means is displaced by the new length of stock under the urging of said guide, and a second switch mounted on the machine and adapted to be operated in response to the movement of the gate as the gate is reciprocated to provide concurrent closing of said first and second switches.

4. The structure defined in claim 1 wherein said positioning means comprises a crank pivotally mounted to the machine having one end thereof linked to the cut-off die, a fluid cylinder linked to the other end of said crank, and a solenoid valve for controlling the operation of said fluid cylinder, said solenoid valve controlled by said first and second means.

5. The structure defined in claim 1 wherein the cut-off die is normally positioned to have stock fed therethrough and may be moved by said positioning means to a position where the end portion of the stock remaining in the cut-off die may be ejected therefrom, and wherein the ejecting bar is mounted on the gate and engages the end portion of the stock to eject it from the cut-off die upon advancement of the gate when the die is in the ejecting position.

6. The structure defined in claim 4 wherein said second means comprises a switch mounted on said machine and adapted to be engaged by said crank after said crank has been rotated in one direction by said air cylinder to cause said solenoid valve to operate said air cylinder to rotate said crank in a direction opposite to its first direction of rotation.

7. The structure defined in claim 1 and further including a timer, and blocking means controlled by said timer for blocking the cut-off knife to prevent the feeding of a new length of stock until the cut-off die is returned to its original position by said positioning means, said timer being under the control of said first switch means and said positioning means.

8. In a machine for positioning metal blanks having a slidably mounted cut-off die, a reciprocating gate and a cut-off knife mounted to be reciprocated in synchronization with the gate over a path substantially parallel to the face of the cut-off die to sever blanks from a length of stock as the stock is being fed to the machine, the combination comprising means controlled by a new length of stock for signalling that a new length of stock is being fed to the machine, means responsive to said signalling means for sliding the slidably mounted cut-off die to a position so that the end portion of the previous length of stock may be ejected therefrom, means responsive to the movement of the cut-off die to control the feeding of the new length of stock, means mounted to the gate for ejecting the end portion of stock from the cut-off die as the gate reciprocates, means responsive to the sliding of the cut-off die to the ejecting position for returning the cut-off die to its original position, and means responsive to the sliding of the cut-off die to the ejecting position for blocking the cut-off knife to prevent the feeding of the new length of stock after the cut-off die has been returned to its original position, said last-named means controlled by a timer for unblocking the cut-off knife after sufficient time has elapsed to assure that the new length of stock has been fed up to the cut-off knife.

References Cited in the file of this patent
UNITED STATES PATENTS

| | | |
|---|---|---|
| 2,364,716 | Huebner et al. | Dec. 12, 1944 |
| 2,730,731 | Schaeffer | Jan. 17, 1956 |
| 2,740,472 | Eckstein | Apr. 3, 1956 |
| 2,777,520 | Grgenkowski | Jan. 15, 1957 |
| 3,095,771 | Vaun et al. | July 2, 1963 |